United States Patent [19]
Berchem

[11] Patent Number: 5,419,371
[45] Date of Patent: May 30, 1995

[54] THROTTLE DEVICE, ESPECIALLY FOR A THROTTLE VALVE, WITH THROTTLE CAGE OF CERAMIC AND METAL LAYERS

[75] Inventor: Rütger Berchem, Essen, Germany

[73] Assignee: Cerpraecis Anwendungen fur Ingenieurkeramik GmbH, Gelsenkirchen, Germany

[21] Appl. No.: 154,779

[22] Filed: Nov. 18, 1993

[30] Foreign Application Priority Data

Nov. 18, 1992 [DE] Germany .................. 42 38 859.7

[51] Int. Cl.⁶ ............................................. F15D 1/02
[52] U.S. Cl. ....................................... 138/42; 138/40; 138/109
[58] Field of Search .............. 138/40, 42, 109; 137/625.28, 625.3; 251/127

[56] References Cited

U.S. PATENT DOCUMENTS

| | | | |
|---|---|---|---|
| 3,725,186 | 4/1973 | Lynch | 138/42 |
| 3,917,221 | 11/1975 | Kubota et al. | 138/42 |
| 4,108,210 | 8/1978 | Luthe et al. | 138/42 |
| 4,249,574 | 2/1981 | Schnall et al. | 138/42 |
| 4,301,836 | 11/1981 | Hunziker | 251/127 |
| 4,921,014 | 5/1990 | Tartaglia et al. | 138/42 |

*Primary Examiner*—James E. Bryant, III
*Attorney, Agent, or Firm*—Herbert Dubno

[57] ABSTRACT

A throttle device, especially a throttle valve, is a throttle cage which is a composite of at least two or three layers including an engineering ceramic layer and at least one metal sleeve. In a two-layer embodiment the ceramic is provided on the upstream side and the metal sleeve on the downstream side. In a three-layer configuration the ceramic layer is sandwiched between metal sleeves. The throttle device is particularly adapted to take up shock stresses and alternating stresses namely temperature and or pressure stresses, and also provides the requisite resistance to corrosion, abrasive action, cavitation and the like to materially increase the useful life of the throttle body.

12 Claims, 4 Drawing Sheets

THROTTLE DEVICE, ESPECIALLY FOR A THROTTLE VALVE, WITH THROTTLE CAGE OF CERAMIC AND METAL LAYERS

FIELD OF THE INVENTION

The present invention relates to a throttle device, especially for a throttle valve, and, more particularly, to a throttle device which is subjected to considerable stress during fluid flow, e.g. thermal, pressure or kinetic stresses, corrosion or erosion stresses and the like.

BACKGROUND OF THE INVENTION

Throttles are widely used in many fields, e.g. in throttle valves, and can comprise a housing containing a throttle cage or body interposed in a flow path of the fluid to be throttled.

Such throttles can be employed, for example, in the chemical industry in a wide variety of chemical processes, in oil fields and, in general, in many applications in which the throttle body is subjected to stress.

Thus stresses can be, for example, pressure stresses, thermal stresses and the like which alternate between periods of high and periods of low temperature and/or pressure stress (alternating stresses).

The throttle body can be formed with openings which not only constrict the fluid flow in the throttling action but provide an energy-dissipative action, i.e. allow streams of the fluid to impinge upon one another to dissipate the energy of such streams.

In addition to the alternating stresses to which the throttle body is made subject, it can be subjected to a variety of mechanical and chemical stresses which can cause deterioration including cavitation stresses, corrosion stresses and abrasive actions. In chemical process technology and in oil field use, substantially all of the aforementioned stresses are applicable at substantially all times. The fluid which is throttled can be a liquid, a gas, a vapor and a chemically corrosive substance or a fluid entraining mechanically abrasive or chemically corrosive material.

In the past, the throttle body, formed as a throttle cage, i.e. a sleeve or tubular member having radial passages which constitute the throttle passages, was usually composed of a steel alloy of a specific composition determined by the processes to which the throttle cage might be subjected. Notwithstanding the selection of a steel composition which was intended to resist deterioration, the life of the throttle body was limited. Indeed, steel compositions which can provide the desired length of the useful life are not available.

While it has been proposed to make the throttle body of an engineering ceramic, here too the life could not be satisfactorily increased because the ceramic structures had limited ability to withstand the shock stresses of a thermodynamic type in both a gas-dynamic or hydrodynamic environment. Although such bodies could withstand abrasion and many types of corrosion, when they were subjected to thermal and mechanical shock, they were less than adequate. Indeed, in many fields ceramic valves or the like have been provided and have a long useful life as long as the stresses to which the valve elements are subjected are less complex and varied than those of the throttle systems with which the present invention is concerned.

OBJECTS OF THE INVENTION

It is, therefore, the principal object of the present invention to provide an improved throttle which will be free from the drawbacks of earlier throttle bodies.

Another object of this invention is to provide a throttle body or cage which can withstand the entire array of stresses described in a highly improved long-term manner.

Still another object of this invention is to provide a throttle body or cage with a significantly enhanced useful life.

SUMMARY OF THE INVENTION

These objects and others which will become apparent hereinafter are attained, in accordance with the invention in a throttle device, especially a throttle valve, for incorporation in a fluid line or apparatus in chemical process technology or in an oil field, which has a housing through which a fluid flow can pass, and a throttle cage or throttle body formed with throttle openings and subjected to the aforementioned alternating processes from pressure and/or temperature of the fluid. According to the invention, the throttle cage consists of at least two layers in a composite, one layer being an engineering ceramic while the other layer is a metal layer, preferably in the form of a metal sleeve. The engineering ceramic can be a tungsten carbide, silicon carbide, silicon nitride or boron nitride or like low-wear, high-hardness ceramic, and the sleeve can be composed of a stainless steel metal composition or alloy which can include hardening metals such as titanium and tungsten.

The throttle cage can be composed of two layers with the engineering ceramic being disposed on the upstream side and the metal sleeve on the downstream side. A three-layer throttle cage according to the invention can have metal sleeves sandwiching the engineering ceramic layer between them so that there is a metal sleeve at both the upstream and the downstream side with the engineering ceramic layer between these sleeves.

In a preferred embodiment of the invention, the engineering ceramic layer is formed as a one-piece sleeve and is connected with the metal sleeve or with the metal sleeves in a manner preventing relative rotation. The engineering ceramic layer can, however, be composed of a plurality of sleeve-shaped elements which are assembled together when the components are fixed in other ways, for example set into a space intervening between the metal sleeves.

The invention is based upon my disclosure that the engineering ceramic can be utilized effectively for the throttle cage when it is supported by one metallic sleeve as described or between two metallic sleeves, capable of taking up the shock stresses to which the ceramic layer might be sensitive. There is, as a result, a functional union of the two materials in the composite structure which enables it to withstand all of the catalog of stresses described above. The connection between the materials can be an adhesive bond or an open bond, i.e. a close-fitting relationship between the layers.

According to a feature of the invention, the layer of engineering ceramic and the metal sleeve or metal sleeves can be bonded together by one or more adhesive layers, especially of a viscoelastic adhesive, the engineering ceramic layer and the metal sleeve or metal sleeves can, however, be fitted together with expansion play i.e. an amount of play required for expansion of the layers with the change in temperature.

What is important for the invention is that the engineering ceramic layer be fitted on or between the metal sleeves free from stresses under the temperatures and at the pressures to which the throttle body is subjected and attributable to the shock stresses generated by the thermodynamic and hydrodynamic or gas-dynamic conditions.

It has been found to be advantageous to provide the engineering ceramic layer and the metallic sleeve or metallic sleeves so that they are generally of the same geometric shape, i.e. cylindrical and that their throttle openings are of the same geometric shapes, i.e. circular. In a referred embodiment of the invention the throttle openings in the metal sleeve or metal sleeves have a cross sectional area greater than the cross sectional area of the passages in the ceramic layer. Preferably the throttle openings in the metallic sleeve or metallic sleeves have areas about 10% greater than the areas of the throttle openings of the engineering ceramic layer.

It will be understood that, in the context of the invention, the materials for the metallic sleeve or sleeves and the material for the layer or layers of engineering ceramic will be selected to suit the specific stresses to which the throttle body is subjected. The result is a throttle body with an especially long useful life.

The throttle apparatus according to the invention, therefore, can comprise:

a housing defining a flow path for a fluid whose flow is to be throttled; and a throttle cage disposed along the flow path and composed of a composite with at least two layers including a layer of an engineering ceramic and a metal layer formed as a metal sleeve, the cage being provided with a multiplicity of throttle passages traversing the layers and throttling the flow of the fluid.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
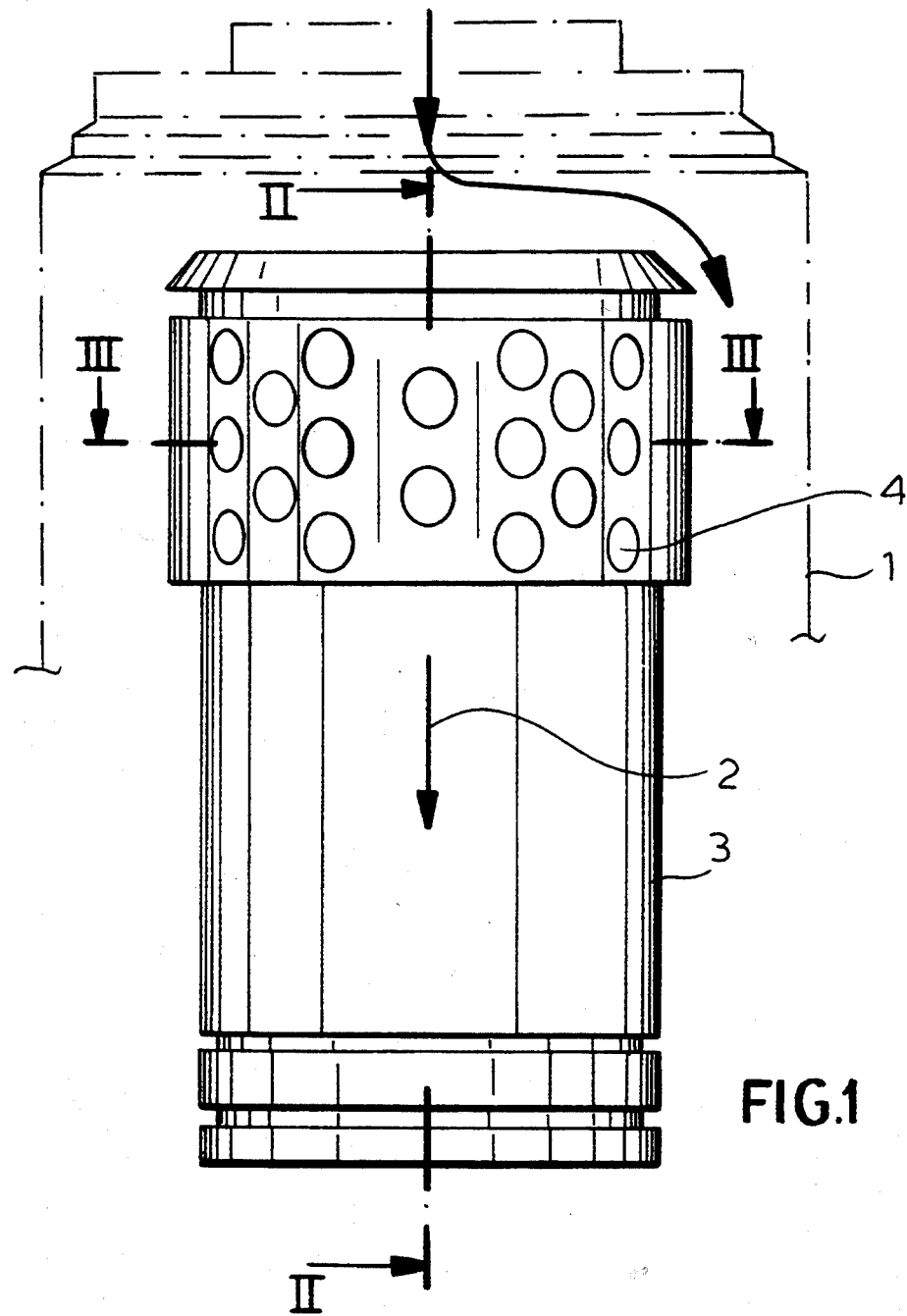
FIG. 1 is a side elevational view of a throttle device according to the invention.

The throttle device shown in the drawing is intended for incorporation in a fluid pipeline or apparatus in the chemical process and/or oil field applications. Basically the apparatus comprises a housing 1 which has been shown only in dot-dash lines in FIG. 1 and which defines a flow path 2 for the fluid which can be a liquid, vapor or gas, free from or entraining abrasive substances, varying in temperature and/or pressure, and which may or may not be chemically corrosive itself or may entrain or contain chemically corrosive substances. Within this flow path 2, a throttle cage or body 3 is provided, the throttle cage 3 having throttle passages 4 which are generally radially directed. The throttle device as a whole and especially its throttle cage can be subjected, therefore, to the alternating stresses, especially of pressure and/or temperature of the fluid.

Figure 4:
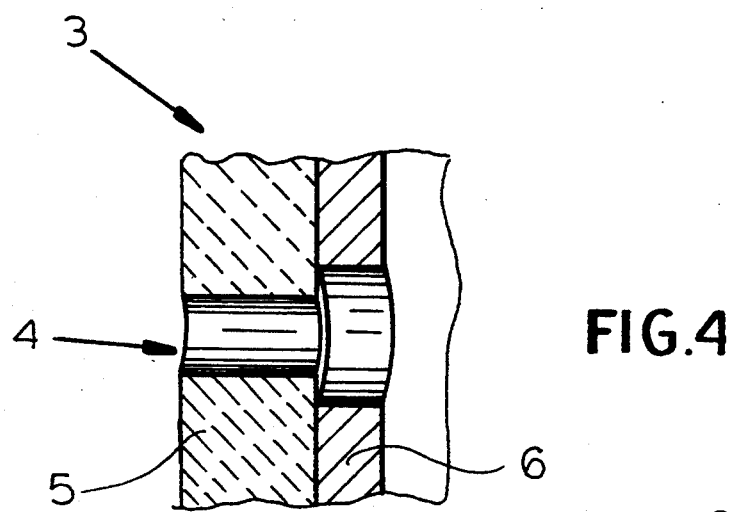
FIG. 4 is a detail view of the layers in the region of a throttle passage in the embodiment of FIGS. 1 and 2.
Figure 5:
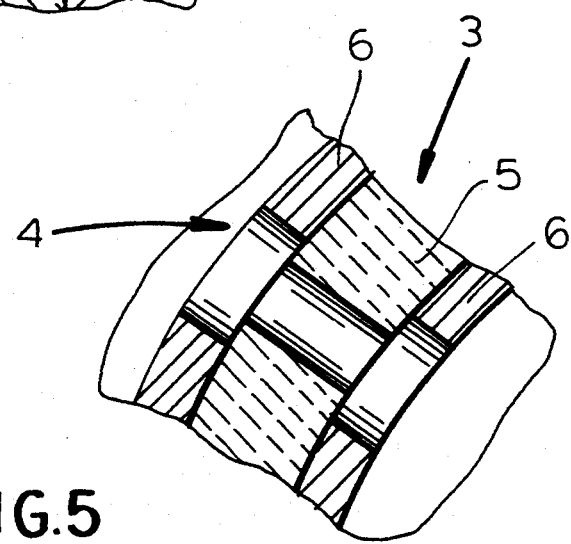
FIG. 5 is a detail view of the region V of FIG. 3.
Figures 7, 8:
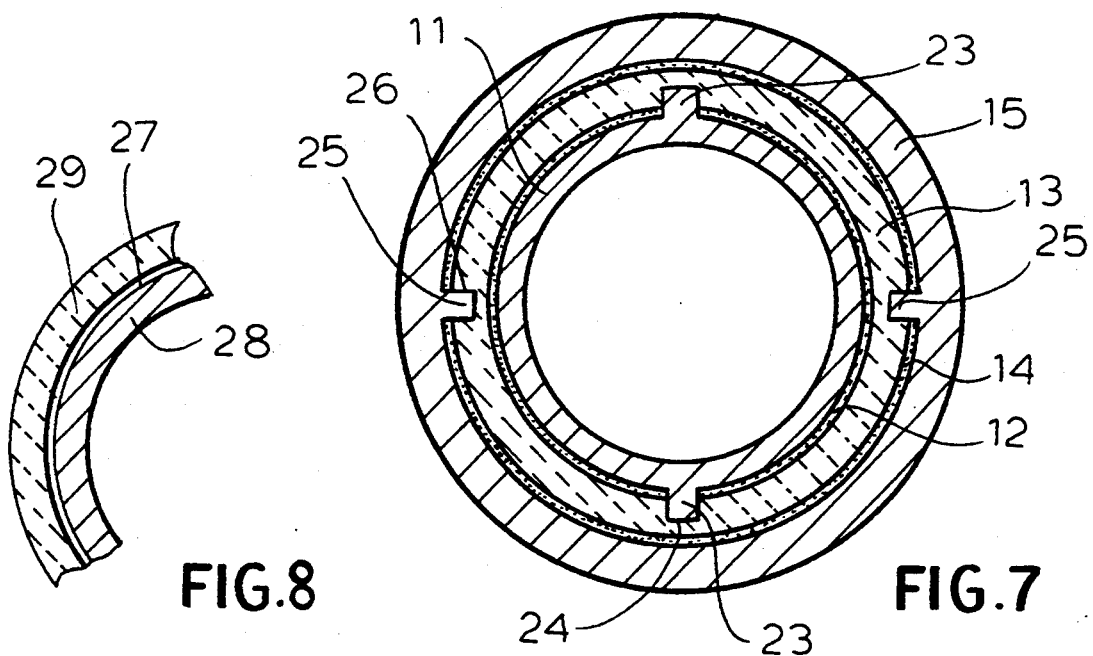
FIG. 7 is a cross sectional view taken along the line VII—VII of FIG. 6.
FIG. 8 is a detail view in cross section showing another embodiment of the invention.

As is especially apparent from FIGS. 4 and 5, the throttle 3 is composed of at least a two-layer composite material, one layer 5 of which is composed of an engineering ceramic such as tungsten carbide, silicon carbide or silicon nitride, while another layer 6 is formed as a metallic sleeve, e.g. of stainless steel which may contain as alloying ingredients, titanium, tungsten and/or zirconium and/or molybdenum as hardening metals and which may be hard-faced as well with, say, tungsten carbide if desired.

Figure 2:
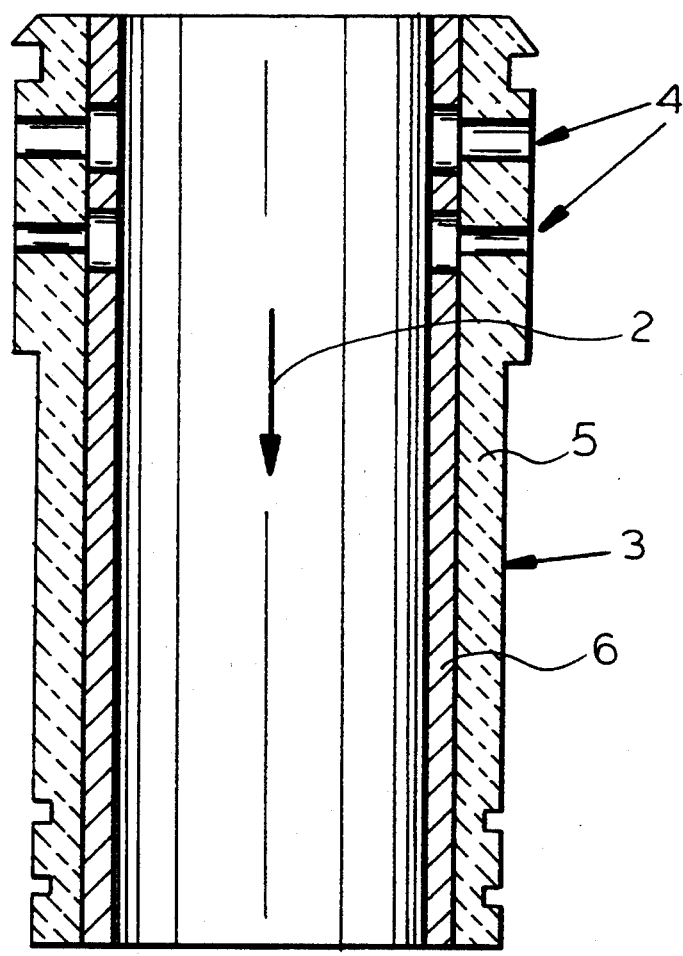
FIG. 2 is a cross sectional view taken along the line II—II of FIG. 1.

In the embodiment of FIGS. 1, 2 and 4, the throttle cage 3 is two-layered with the engineering ceramic layer 5 at the upstream side and a metal sleeve 6 at the downstream side.

Figure 3:
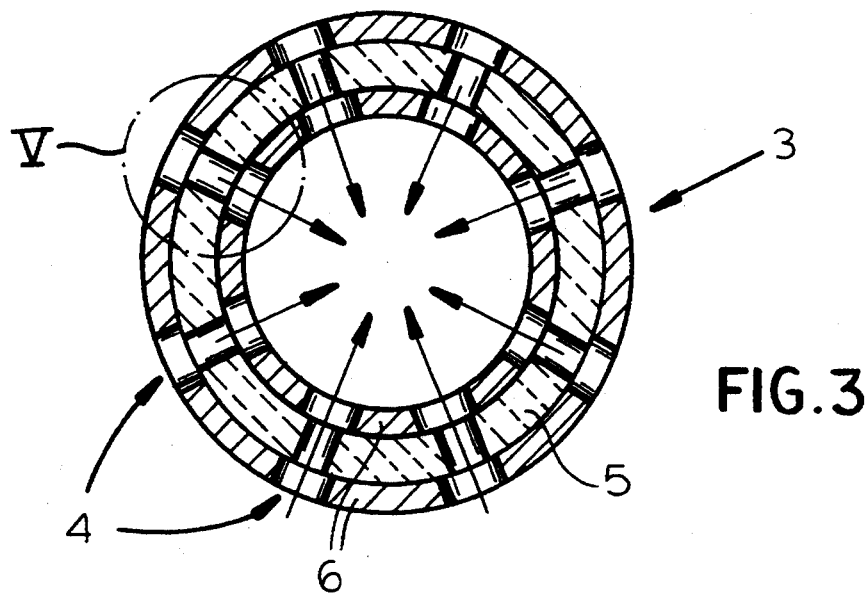
FIG. 3 is a cross sectional view taken along the line III—III of FIG. 1 but illustrating an embodiment in which two metallic sleeves are provided.

In the embodiment of FIGS. 3 and 5, the throttle cage is three-layered with a metal sleeve 6 at the upstream side, a metal sleeve 6 at the downstream side and the ceramic layer 5 between these sleeves. From the Figures of the drawing it will be apparent that the layer of engineering ceramic 5 may also be a one-piece sleeve. The sleeves can be connected together in a manner preventing rotation of one sleeve relative to another. The engineering ceramic layer 5 can, however, also be composed of a plurality of elements assembled in a modular manner or in an imbricated pattern.

As previously noted, the engineering ceramic layer 5 and the metallic sleeve 6 or the metallic sleeves 6 can be fitted one inside the other with a play enabling expansion and they can be connected by a viscoelastic adhesive in a stress-free manner.

In the embodiments illustrated in FIGS. 1–5, the throttle cages 3 can have circular throttle openings 4 with the openings in the metallic sleeves having an area some 10% greater than the area of the openings in the engineering ceramic layer.

As can be seen from FIG. 3, the throttle passage 4 can be directed radially inwardly so that the jets of fluid or streamlets as represented by the arrows 10 can be directed against one another in an engineering dissipating manner.

Figure 6:
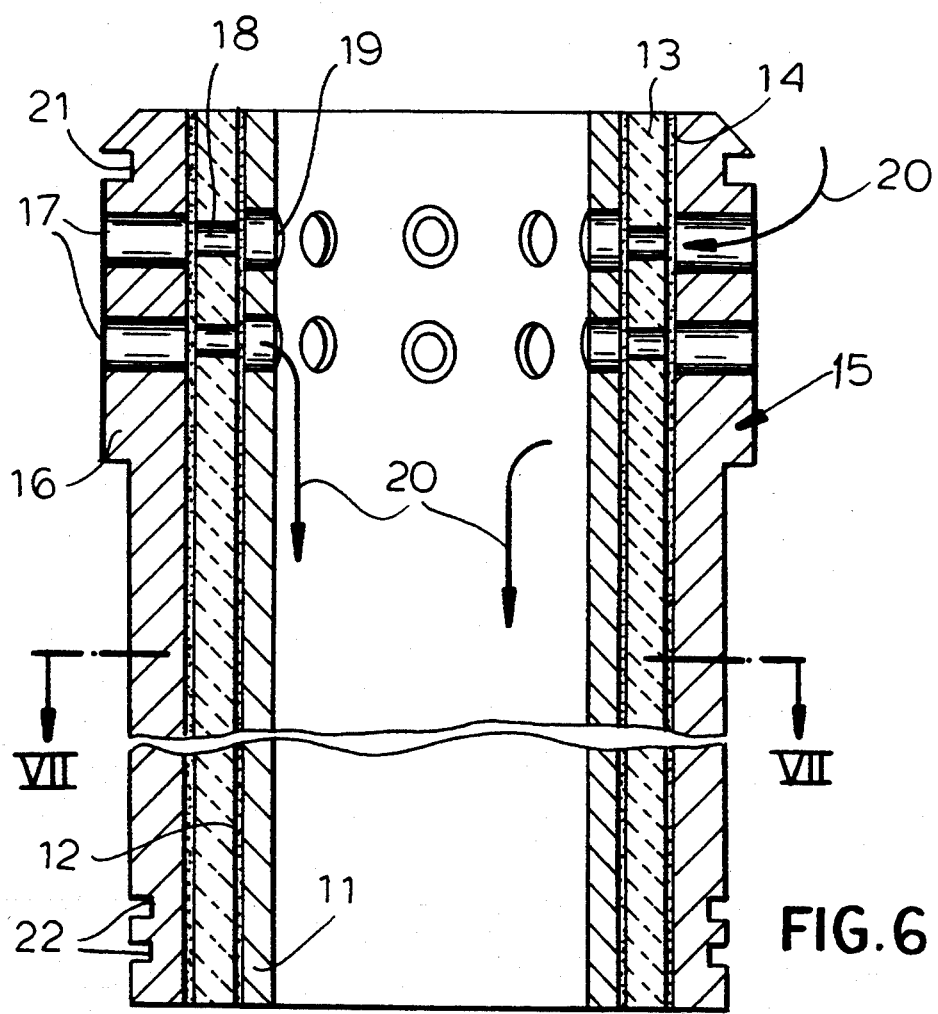
FIG. 6 is a view similar to FIG. 2 illustrating another embodiment.

In FIG. 6, I show a three-layer arrangement wherein the inner metal sleeve 11 is bonded by a viscoelastic adhesive 12 to the ceramic sleeve 13 and the ceramic sleeve 13 is bonded by the viscoelastic layer 14 to the outer metal sleeve 15. The latter can have a cylindrical boss 16 formed with the openings 17 which in cross sectional area are 10% greater than the cross sections of the bores 18 aligned therewith and formed in ceramic sleeve 13. The bores 18, in turn, are aligned with openings 19 also larger by about 10% in cross sectional area than the bores 18 and formed in the inner sleeve 11. The flow direction, therefore, is represented by the arrows 20 in FIG. 6.

An O-ring seal can be received in a groove 21 of the boss 16 and in grooves 22 at the opposite end of the throttle body. These O-rings can seal in the housing 1.

The inner sleeve 11 is prevented from rotating relative to the ceramic layer 13 by radially projecting ribs or keys 23 which engage in grooves 24 formed in the engineering ceramic layer 13. Similarly, the outer metal sleeve 15 can have inwardly extending ribs 25 engaging in downwardly open grooves 26 of the ceramic body.

Instead of viscoelastic layer 12 or 14 between the layers, a compensating clearance 27 can be provided between a metal sleeve 28 and the ceramic sleeve 29 if desired.

I claim:

1. A throttle device, especially a throttle valve, comprising:
    a housing defining a flow path for a fluid whose flow is to be throttled; and
    a throttle cage disposed along said flow path and composed of a composite with at least two layers including a layer of an engineering ceramic and a metal layer formed as a metal sleeve, said cage being provided with a multiplicity of throttle passages traversing said layers and throttling said flow of said fluid.

2. The throttle device defined in claim 1 wherein said throttle cage is composed of two layers with said engineering ceramic disposed at a relatively upstream side and said metal sleeve disposed at a relatively downstream side with respect to flow of said fluid through said passages.

3. The throttle device defined in claim 1 wherein said throttle cage is composed of three layers including a first metal sleeve disposed at an upstream side of said passages in a direction of flow of said fluid, a second metal sleeve disposed at a downstream side of said passages in said direction, and said engineering ceramic layer between said metal sleeves.

4. The throttle device defined in claim 1 wherein said layer of said engineering ceramic is formed as a one-piece sleeve, said sleeves being provided with means for securing said sleeves against relative rotation.

5. The throttle device defined in claim 1, further comprising a layer of an adhesive between said layer of engineering ceramic and said metal sleeve for stress-free bonding of said layers together.

6. The throttle device defined in claim 5 wherein said adhesive layer is a viscoelastic layer.

7. The throttle device defined in claim 1 wherein said layer of engineering ceramic and said metal sleeve are fitted together with play for expansion and contraction.

8. The throttle device defined in claim 1 wherein said layer of engineering ceramic and said metal sleeve are of the same geometric shape.

9. The throttle device defined in claim 1 wherein said passages are of greater cross sectional area in said metal sleeve than in said engineering ceramic.

10. The throttle device defined in claim 9 wherein the cross sectional area of each passage is substantially 10% greater in said metal sleeve than in said engineering ceramic.

11. The throttle device defined in claim 1 wherein said passages have circular cross section.

12. The throttle device defined in claim 1 wherein said passages train respective streamlets against one another to dissipate energy of said fluid.

* * * * *